(12) United States Patent
Aarre et al.

(10) Patent No.: US 8,380,440 B2
(45) Date of Patent: Feb. 19, 2013

(54) 3D RESIDUAL BINNING AND FLATNESS ERROR CORRECTION

(75) Inventors: Victor Aarre, Stavanger (NO); Patrick Smith, Stavanger (NO)

(73) Assignee: WesternGeco L.L.C., Houston, TX (US)

( * ) Notice: Subject to any disclaimer, the term of this patent is extended or adjusted under 35 U.S.C. 154(b) by 980 days.

(21) Appl. No.: 12/131,894

(22) Filed: Jun. 2, 2008

(65) Prior Publication Data

US 2009/0299639 A1    Dec. 3, 2009

(51) Int. Cl.
*G01V 1/28*    (2006.01)
*G01V 1/00*    (2006.01)

(52) U.S. Cl. ............. 702/17; 702/14; 702/189; 702/190

(58) Field of Classification Search ............... 702/14–18, 702/50–55, 116–126, 189–191, 193–195
See application file for complete search history.

(56) References Cited

U.S. PATENT DOCUMENTS

| | | | |
|---|---|---|---|
| 5,940,778 A * | 8/1999 | Marfurt et al. ................. | 702/16 |
| 5,995,446 A | 11/1999 | Meyer et al. | |
| 2003/0031091 A1 | 2/2003 | Kim | |
| 2004/0044480 A1 * | 3/2004 | Wood .............................. | 702/17 |

FOREIGN PATENT DOCUMENTS

WO    9967660 A    12/1999

OTHER PUBLICATIONS

Perez, et al., Fine-Tuning Your Seismic Image: Prestack Data Warping to Improve Stack Quality and Resolution, SEG 2006 Annual Meeting.*
Perez et al. (hereinafter "Perez"), Fine-Tuning Your Seismic Image: Prestack Data Warping to Improve Stack Quality and Resolution, SEG/New Orleans 2006 Annual Meeting, pp. 2475-2479.*
PCT Search Report, dated Jan. 5, 2010, Application No. PCT/US2009/0444943.
Cachier, et al., Fast Non Rigid Matching by Gradient Descent: Study and Improvements of the Demons Algorithm, INRIA, Jun. 1999, No. 3706.
Gulunay, et al., Robust Residual Gather Flattening, SEG 2007 Annual Meeting.
Gulunay, et al., Gather Flattening, The Leading Edge, Dec. 2007.
Fugro, Preconditioning of Data, webpage: http://www.fugro-fsi.com/services/ip.asp.

* cited by examiner

*Primary Examiner* — Phuong Huynh

(57) ABSTRACT

A method for processing seismic data. The method may include splitting the seismic data into multiple datasets according to one or more offsets; determining a first shift amount in three or more dimensions of the seismic data between a dataset having a first offset and a dataset having a second offset, determining a second shift amount in the three or more dimensions between the dataset having the second offset and a dataset having a third offset, determining a cumulative shift amount based on a shift of the first shift amount and the second shift amount and determining a corrected dataset based on the dataset having the third offset and the cumulative shift amount.

24 Claims, 8 Drawing Sheets

3D RESIDUAL BINNING AND FLATNESS ERROR CORRECTION

BACKGROUND

1. Field of the Invention

Implementations of various technologies described herein generally relate to a method for correcting pre-stack seismic data.

2. Description of the Related Art

The following descriptions and examples do not constitute an admission as prior art by virtue of their inclusion within this section.

Seismic data signals are typically acquired by measuring and recording data during a seismic survey. A seismic survey may be performed by repeatedly firing an impulsive seismic energy source at the surface of the earth, sea or seafloor and recording the received signals at a set of receivers. The receivers may typically be situated at the same surface as the source, but laterally displaced on regular grid positions. However, there may be situations where a non-regular distribution of the receivers is preferred or where the source and the receivers may be positioned at different depth levels. In a typical seismic survey, the source and the receivers may be displaced at fixed intervals (e.g., 35 meters) and in a certain direction (e.g., the "inline" direction). During the seismic survey, the cycle of firing the source and recording the received signals may be repeated a plurality of times. When firing the seismic source, a pressure wave may be excited and propagate into the subsurface. The pressure wave reflects off interfaces between various earth layers (such as rock, sand, shale, and chalk layers) and propagates upwardly to the set of receivers, where the particle velocity of the wave vibrations or the pressure oscillations of the wave may be measured and recorded. The strength of the reflected wave is proportional to the amount of change in elastic parameters, e.g., density, pressure velocity, and shear velocity, at the respective interfaces. Consequently, the data recorded by the receivers represents the elastic characteristics of the subsurface below the receivers. In order to arrive at volumetric images of the subsurface, the recorded signals may be processed to reduce noise and to focus and map the seismic signals to the points where the reflections occurred.

The recording of a single inline survey may commonly be referred to as a 2D seismic survey, whereas a plurality of inline surveys may commonly be referred to as a 3D seismic survey. Often, two or more 3D seismic surveys may be obtained from the same subsurface area at different times, typically with time lapses ranging from about a few months to a few years. Such surveys may commonly be referred to as time-lapse surveys. In this manner, seismic data may be acquired to monitor changes in the subsurface reservoirs caused by the production of hydrocarbons.

In a time-lapse survey when two seismic data traces are compared, two factors may change, i.e., the receptivity and the signal two-way travel time within the reservoir. When considering a seismic data set, the receptivity may be the amplitude of the seismic signal along one axis and the two-way travel time may be the time along the other axis. When analyzing the time-lapse survey, it may be desirable to discriminate between amplitude changes and two-way travel time changes or time shifts. A displacement field describing the time shift may be calculated and applied to one of the surveys.

SUMMARY

Described herein are various techniques directed to a method for processing seismic data. The method may include splitting the seismic data into multiple datasets according to one or more offsets; determining a first shift amount in three or more dimensions of the seismic data between a dataset having a first offset and a dataset having a second offset, determining a second shift amount in the three or more dimensions between the dataset having the second offset and a dataset having a third offset, determining a cumulative shift amount based on a shift of the first shift amount and the second shift amount and determining a corrected dataset based on the dataset having the third offset and the cumulative shift amount.

Described herein are also technologies for a computer-readable medium having stored thereon computer-executable instructions which, when executed by a computer, cause the computer to: determine a first shift amount in each dimension of the seismic data between a dataset having a first offset and a dataset having a second offset; determine a second shift amount in each dimension of the seismic data between the dataset having the second offset and a dataset having a third offset; determine a cumulative shift amount based on a shift of the first shift amount and the second shift amount; and determine a corrected dataset based on the dataset having the third offset and the cumulative shift amount.

Described herein are also technologies for a computer system having a processor; and a memory having program instructions executable by the processor to: pre-stack migrate seismic data; split the seismic data into multiple datasets according to one or more offsets of the seismic data; determine a first shift amount between a dataset having a first offset and a dataset having a second offset, wherein the first shift amount comprises binning errors for an inline dimension, crossline dimension and depth dimension; determine a second shift amount between the dataset having the second offset and a dataset having a third offset, wherein the second shift amount comprises the binning errors for the inline dimension, the crossline dimension, and the depth dimension; determine a cumulative shift amount based on a shift of the first shift amount and the second shift amount; determine a corrected dataset based on the dataset having the third offset and the cumulative shift amount. The first shift amount and the second shift amount are determined using a three-dimensional matching process.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

In general, one or more implementations of various technologies described herein are directed to a method for correcting pre-stack seismic data for image and other seismic data processing. In operation, pre-stack seismic data may be parsed into multidimensional datasets based on position offsets. Position offsets are relationships of distances and/or angles between sensors and reflection points in subsurface materials. The multidimensional datasets may be matched against neighboring offset datasets in order to determine relative shifts along x, y and z axes of the seismic data. Cumulative shifts for each offset that account for the total shift between each offset dataset and a reference dataset may then be determined by a shift of each of the relative shifts. The cumulative shifts may then be applied to the offset datasets to derive the corrected data. The corrected data may be merged back into a single dataset.

Figure 1:
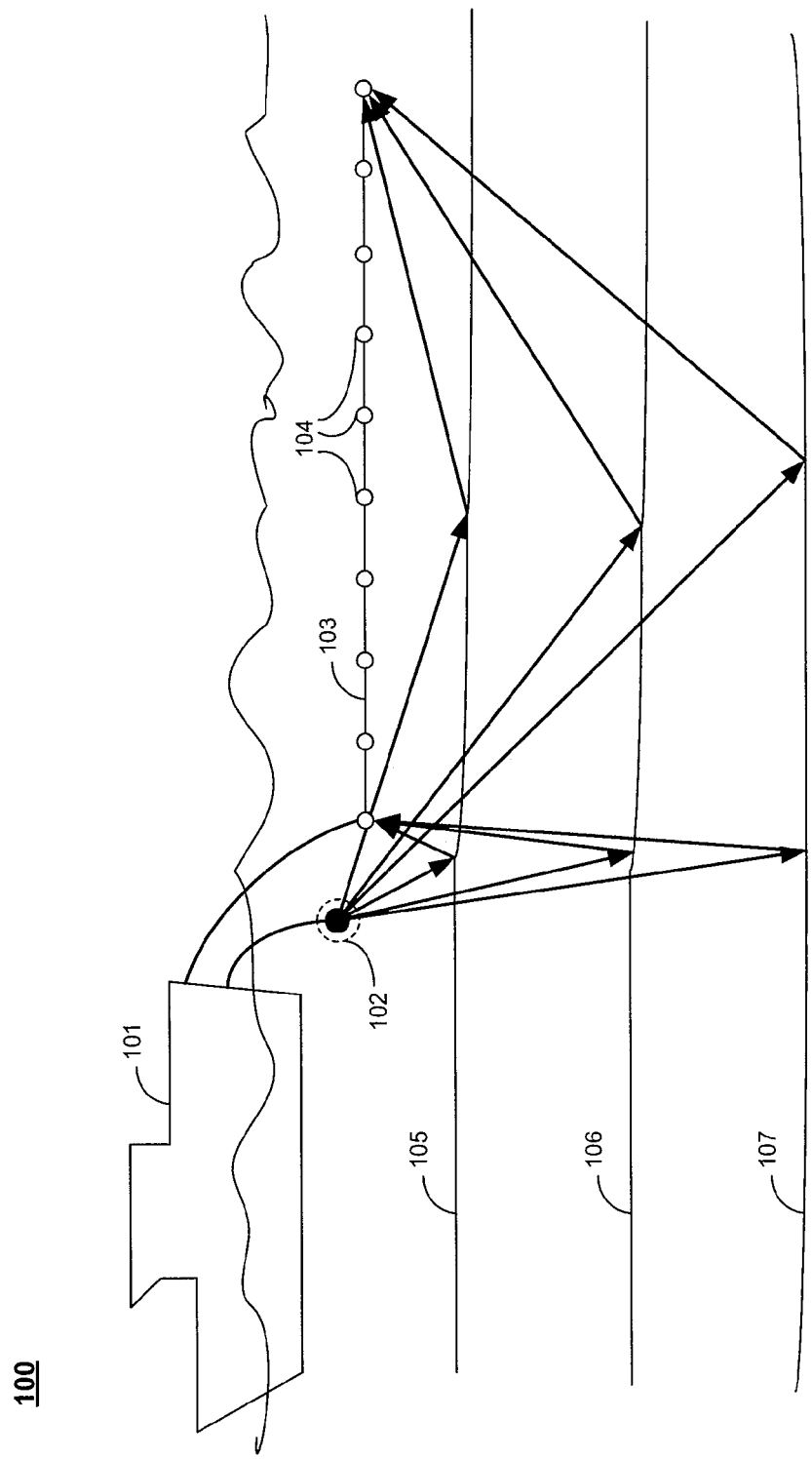
FIG. 1 illustrates a schematic diagram of a system for obtaining seismic data signals from a subsurface area in a marine environment in accordance with one or more implementations of various techniques described herein.

FIG. 1 illustrates a schematic diagram of a system for obtaining seismic data signals from a subsurface area in a marine environment in accordance with one or more implementations of various techniques described herein. A seismic survey vessel 101 is used to tow a seismic source, such as an airgun 102, and a plurality of seismic sensors/receivers 114 carried on a streamer 103. The streamer 103 contains a plurality of hydrophones 104 which sense acoustic impulses and transmit the seismic data signals, referred to as seismic traces, to the seismic survey vessel 101 where they are typically digitized and recorded. A number of seismic sensors/receivers 114 may also be placed on the sea bed 105. The receivers also sense acoustic impulses, and transmit the seismic traces to the seismic survey vessel 101. The airgun 102 produces a series of acoustic pulses, a portion of which are partially reflected by the sea bed 105 and a portion of which penetrate through the sea bed and are reflected by boundaries 106 and 107 between the geologic layers have differing acoustic impedances. Often two or more streamers 103 will be towed behind the seismic survey vessel 101 and a three dimensional set of seismic data will be obtained. The survey process described above is typically repeated in differing sail directions, referred to as multi-azimuth acquisition. The survey may also be repeated during different times of the year, providing time-lapse data that may be used to determine changes in the boundaries 106, 107 due to hydrocarbon extraction or other activities. The process shown in FIG. 1 is well known in the art and, in and of itself, forms no part of various techniques described herein.

Figure 2:
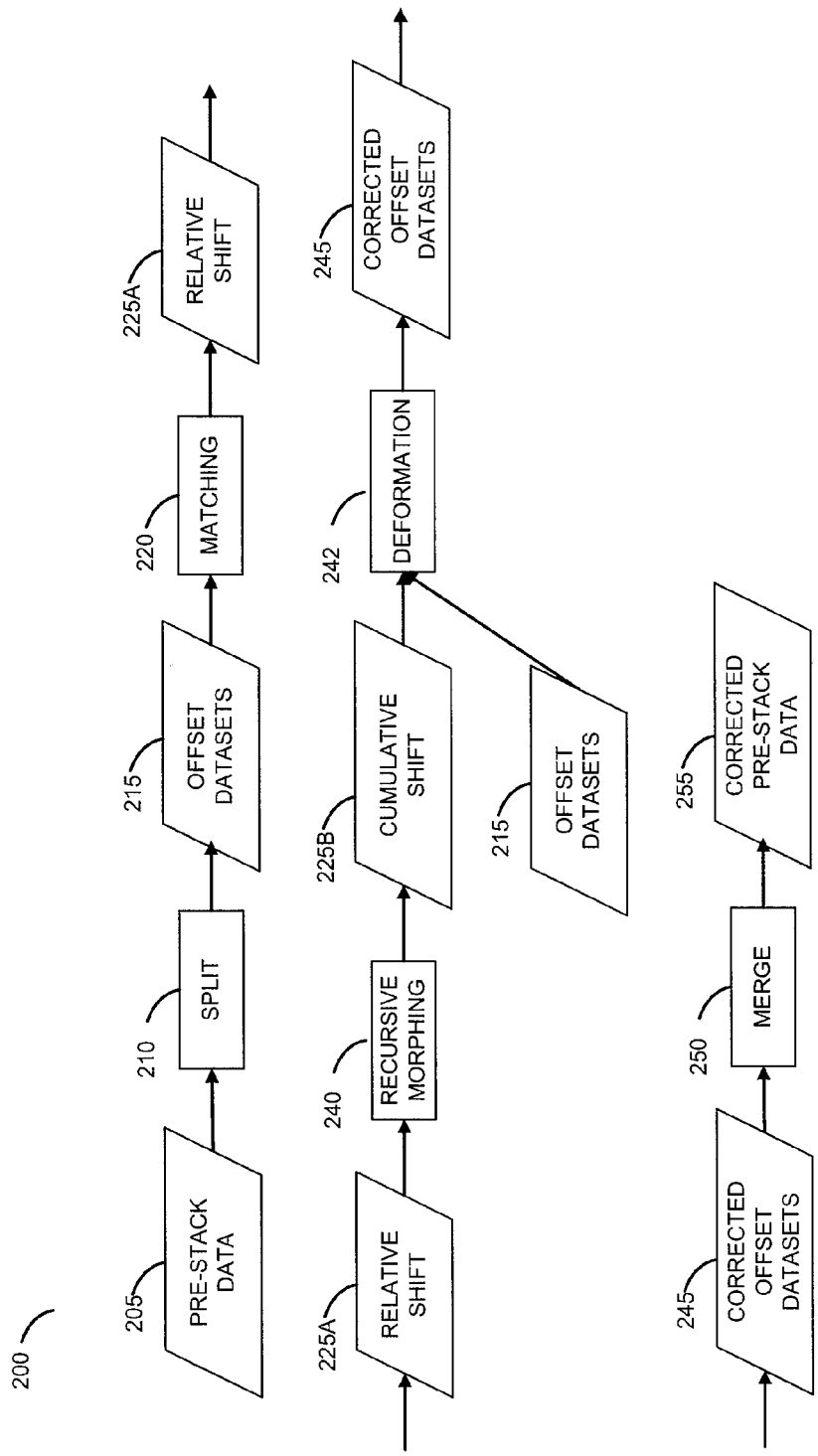
FIG. 2 illustrates a data flow diagram of a method in accordance with one or more implementations of various techniques described herein.

FIG. 2 illustrates a data flow diagram of a method 200 in accordance with one or more implementations of various techniques described herein. Pre-stack data 205 may be seismic data obtained as described in FIG. 1. The pre-stack data 205 may be contained within a multi-dimensional data structure. In one implementation, each dimension of the data structure may be defined by information about the subsurface area being surveyed, i.e., reflection points. Such information may include inline, crossline, and depth positions. The pre-stack data 205 may include another dimension for the offset of the hydrophones with respect to a reference point on the streamer. While four dimensions are described herein, those skilled in the art recognize that various techniques described herein could incorporate additional dimensions, such as an azimuth with respect to the plane of the streamers 103 and the seismic sensors 114.

The method 200 may produce corrected pre-stack data 255. The corrected pre-stack data 255 may reflect the pre-stack data 205 corrected such that data collected from the hydrophones at each offset may approximate the pre-stack data 205 collected at the reference offset. By approximating the pre-stack data 205 to the reference offset, errors produced in later image processing may be reduced.

The pre-stack data 205 may be input to a split process 210. The split process 210 may be configured to split the pre-stack data 205 into multiple offset datasets 215, i.e., one offset dataset 215 for each offset value in the pre-stack data 205. The offset datasets 215 may be input to a matching process 220. The matching process 220 may compare the data for offset datasets 215 of neighboring offsets to determine the relative shift 225A in each dimension from an offset i to offset i−1. The matching process 220 is described in greater detail in the description for FIG. 3A.

The relative shifts 225A may be input to a recursive morphing process 240 that determines the cumulative shift 225B from a reference offset to the offset datasets 215 for each offset. The cumulative shift 225B may represent the total shift in each dimension between the offset datasets 215 for a particular offset and a reference offset. In one implementation, the reference offset is the zero offset. Alternatively, the reference offset dataset 215 may be generated by stacking offset datasets 215 for multiple offsets. Stacking offset datasets 215 for multiple offsets may attenuate errors, or noise, in the data.

Because the relative shift 225A of each offset dataset 215 is positioned relative to the offset dataset 215 for the neighboring offset, the morphing process 240 may "shift" each of the relative shifts 225A in order to determine the cumulative shift 225B for each offset. The morphing process 240 is described in greater detail in the descriptions for FIG. 3B and FIG. 4.

The cumulative shifts 225B and the offset datasets 215 are input to a deformation process 242. The deformation process 242 may apply the cumulative shifts 225B for each offset to the respective offset datasets 215. The deformation process produces corrected offset datasets 245 for each offset. The corrected offset datasets 245 are then merged back into the single corrected pre-stack data 255 by a merge process 250.

Figure 3A:
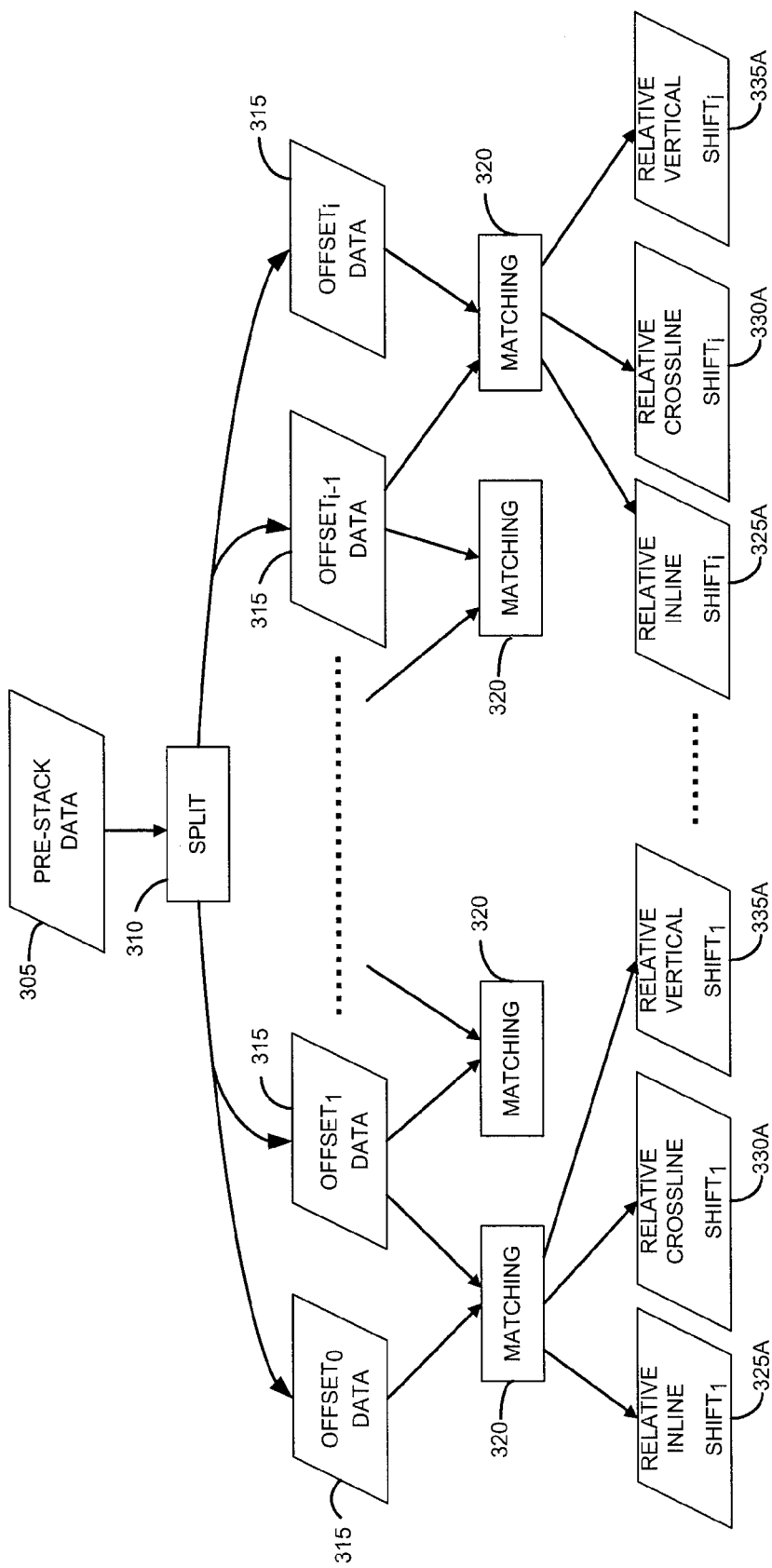
FIGS. 3A-3D illustrate a data flow diagram of a method for correcting pre-stack seismic data in accordance with one or more implementations of various techniques described herein.
Figure 3B:
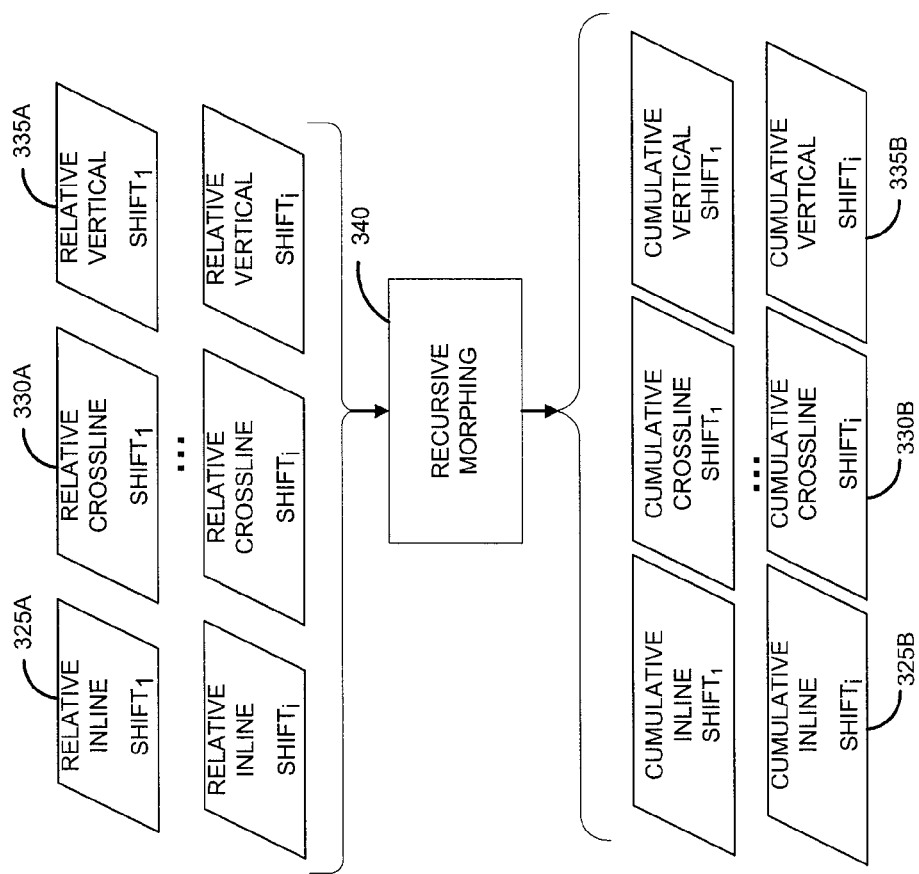
Figure 3C:
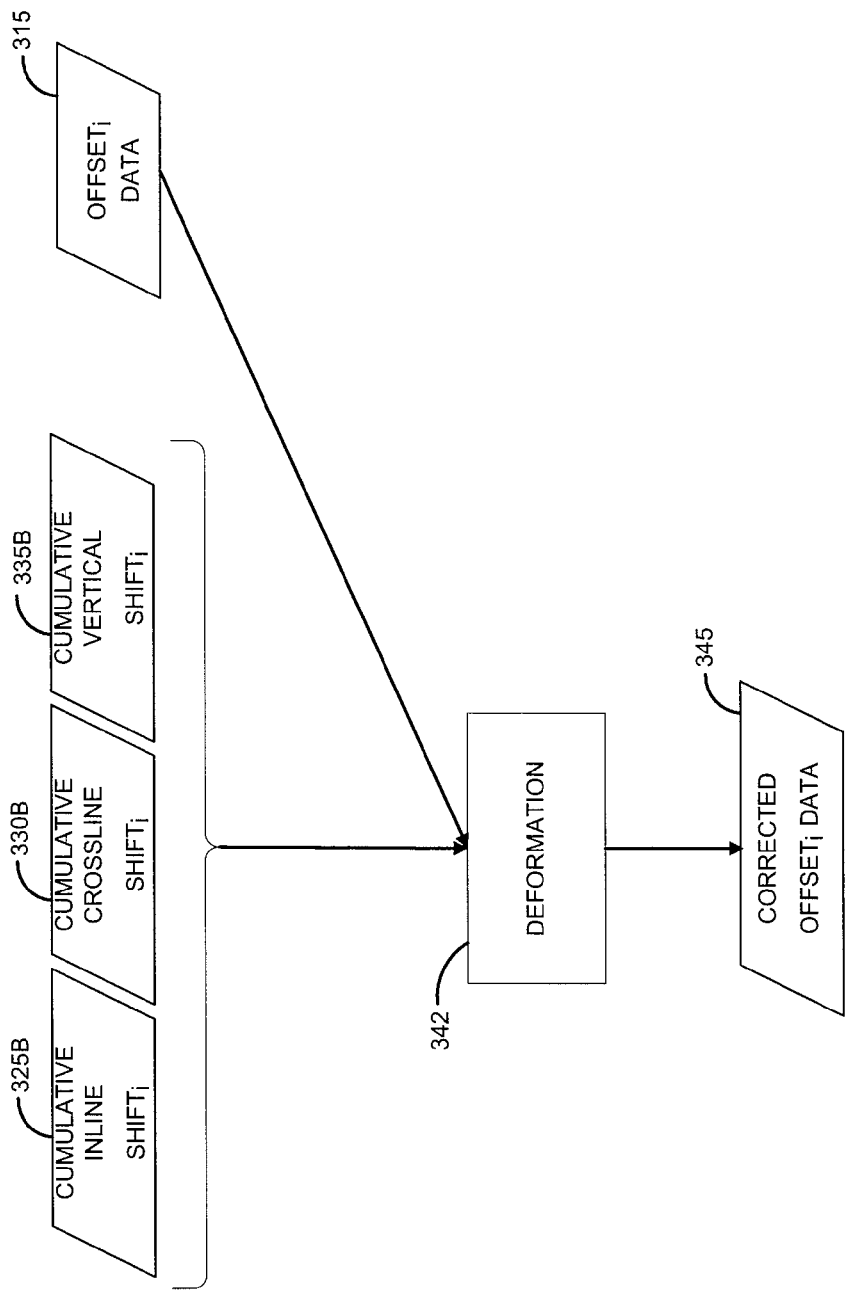

FIGS. 3A-3C illustrate a data flow diagram of a method for correcting pre-stack data 305 in accordance with one or more implementations of various techniques described herein. As stated, the pre-stack data 305 is input to a split process 310, which produces an offset$_i$ data 315 for each offset i. In one implementation, the pre-stack data 305 may be output from a pre-stack migration process. Typically, the pre-stack migration process is a correction of the location data that accounts for rapid lateral velocity changes in the survey area.

Neighboring offset$_i$ data 315, e.g., offset data$_{i,\,i-1}$, may then be input to a multi-dimensional matching process 320. Each matching process 320 may produce three datasets, collectively representing a shift in three dimensions between offsets$_{i,\,i-1}$. The relative inline shift 325A represents the binning error in the sail direction. The relative crossline shift 330A represents the binning error in the crossline/receiver direction. The relative vertical shift 335A represents the binning error in the direction of depth. In one implementation, each of the three shift datasets is the same size as the input offset data 315.

In one implementation, a filter, e.g., a mean or Gaussian filter, may be applied to the relative shifts 325A, 330A, and 335A in the direction of the particular offset. The filter may attenuate large variations in the amount of shift between the neighboring offsets. The filter size may be offset-dependent in order to account for the growth in size of the shifts as the offsets become further distant from the reference offset.

In another implementation, the matching process 320 and filtering may be repeated recursively. The number of recursions may vary based on requirements for later image processing, and/or resources available for performing the matching process 320. In the recursive implementation, the filtered relative shifts may be input to the matching process 320. The matching process 320 may then produce a new set of relative shifts 325A, 330A, and 335A, which may be filtered and re-input to the matching process 320.

As stated, the pre-stack data 305 may be obtained in other dimensions in addition to the inline, crossline, and vertical dimensions. As such, implementations of the matching process 320 may produce more than the three datasets described herein, one for each of the additional dimensions.

In one implementation, the matching process is a 3-dimensional (3D) non-rigid matching process. The 3D non-rigid matching process may generate a displacement vector for each sample of signal data between offset$_{i,\ i-1}$ in offset$_i$ data 315 and offset$_{i-1}$ data 315, respectively. Each component of the displacement vector (d(x, y, z)) may represent a shift in one dimension. Accordingly, each of the shift datasets 325A, 330A, and 335A correspond to one component of the displacement vector.

Following is a description of a 3D non-rigid matching process. The process as applied to two dimensions is presented for the sake of clarity. The extension of the process to three dimensions is trivial. The split datasets are used to calculate the following entities in an iterative manner:

$$d_{x,i}(x,z) = \frac{S_{x,i}(x,z) \cdot \Delta S_i(x,z)}{\alpha_R^2 + S_{x,i}^2(x,z) + S_{z,i}^2(x,z)}$$

$$d_{z,i}(x,z) = \frac{S_{z,i}(x,z) \cdot \Delta S_i(x,z)}{\alpha_R^2 + S_{x,i}^2(x,z) + S_{z,i}^2(x,z)}$$

Here, $d_{x,i}(x,z)$ and $d_{z,i}(x,z)$, which make up the displacement vector, $d_i(x,z)$ is the estimated displacement for sample (x,z) in the x-direction and z-direction, respectively, at the iteration i. Note that the time dimension has also been omitted in these equations in order to enhance the readability of the formulas. Further, $S_{x,i}(x,z)$ is the average spatial derivative along the x-direction at iteration i, given by:

$$S_{x,i}(x,z) = \frac{1}{2}\left(\frac{\partial}{\partial z}S_{ref}(x,z) + \frac{\partial}{\partial z}S_i(x,z)\right)$$

where $S_{ref}(x,z)$ is the first (reference) dataset and $S_i(x,z)$ is the current matched version of the second sample set. The latter quantity is gained by translating the samples of $S_{i-1}(x,z)$ along the estimated displacement $d_i(x,z)$:

$$S_i(x,z) = I[S_{i-1}(x-d_{z,i-1}(x,z,(z-d_{z,i-1}(x,z))]$$

where i denotes an interpolation operator that is necessary because the displacement vector has subsample precision. This means that though sample indices have to be integer values, the displacement can be a fraction of a sample width/height. The value of the sample at such an intersample position is gained through interpolation. The interpolation may be bilinear, or have a higher order. In the preferred embodiment of the present invention, a 3D sync interpolation scheme is applied. For the first iteration $S_{i-1}(x,z)=S_o(x,z)$ is the second sample set, and $d_{i-1}=(d_{x,i-1},d_{z,i-1})=(d_{x,0},d_{z,0})$ is the resulting displacement field from the previous stage. The initial displacement field is set to zero.

Correspondingly, the averaged derivative in the z-direction at the $i^{th}$ iteration, $S_{z,i}(x,z)$, is given as:

$$S_{z,i}(x,z) = \frac{1}{2}\left(\frac{\partial}{\partial z}S_{ref}(x,z) + \frac{\partial}{\partial z}S_i(x,z)\right)$$

Furthermore, the matched sample set difference at iteration, i, is obtained as:

$$\Delta S_i(x,z) = S_i(x,z) - S_{ref}(x,z)$$

Finally, $\alpha_R$ is a parameter to control the smoothness of the estimated displacement field. $\alpha_R$ could also be set differently for the horizontal and vertical directions. This may be warranted due to differences in the smoothness of the seismic data signals in the vertical and horizontal directions.

In one implementation, the pre-stack data 305 may not be split. Instead, the matching process 320 may performed using four dimensions, with the offset as the fourth dimension. In such an implementation, only one matching process 320 may be performed. However, the matching process 320 may still produce relative shifts 325A, 330A, and 335A for each offset, as shown in FIG. 3A.

As shown in FIG. 3B, the relative inline shift$_i$ 325A, relative crossline shift$_i$ 330A, and relative vertical shift$_i$ 335A are input to a recursive morphing process 340 to generate cumulative inline shift 325B, cumulative crossline shift 330B, and cumulative vertical shift 335B for each offset.

It should be noted that the cumulative shifts 325B, 330B, and 335B are not simple sums of the preceding relative shifts. Rather, the relative shift for each offset i is positioned relative to offset i−1. As such, recursive morphing process 340 may be configured to spatially and temporally shift the relative shifts 325A, 330A, and 335A for each offset in order to determine the cumulative shifts 325B, 330B, and 335B.

The recursive morphing process 340 may determine a cumulative shift for each offset, I, that estimates the total shift between the offset i and the reference offset. As such, the cumulative inline shift$_i$ 325B represents the total inline shift between offset and the reference offset. Similarly, the cumulative crossline shift$_i$ 330B represents the total crossline shift, and the cumulative vertical shift$_i$ 335B represents the total vertical shift, between offset i and the reference offset. The recursive morphing process 340 is described in greater detail in the description for FIG. 4.

FIG. 3C illustrates a data flow diagram of a method for correcting pre-stack seismic data in accordance with one or more implementations of various techniques described herein. The cumulative inline shift$_i$ 325B, cumulative crossline shift$_i$ 330B, and the cumulative vertical shift$_i$ 330B, are input to the deformation process 342 with the offset$_i$ data 315 for each offset i. The deformation process 342 applies the cumulative shifts in each dimension to the offset data to produce the corrected offset$_i$ data 345.

Figure 3D:
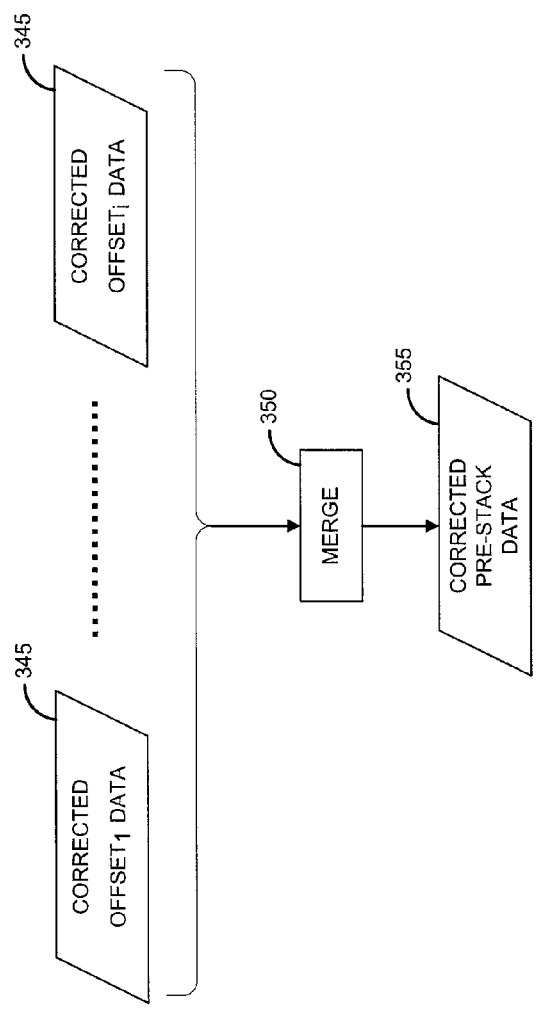

The corrected offset$_i$ data 345 may represent offset$_i$ data 315 corrected in the inline, crossline, and vertical dimensions with regard to the reference offset dataset. Collectively, the corrected offset$_i$ data 345 represent all the corrected pre-stack data 305. Accordingly, in FIG. 3D, the corrected offset$_i$ data 345 for all offsets, i, are input to a merge process 350 that produces the corrected pre-stack data 355.

Figure 4:
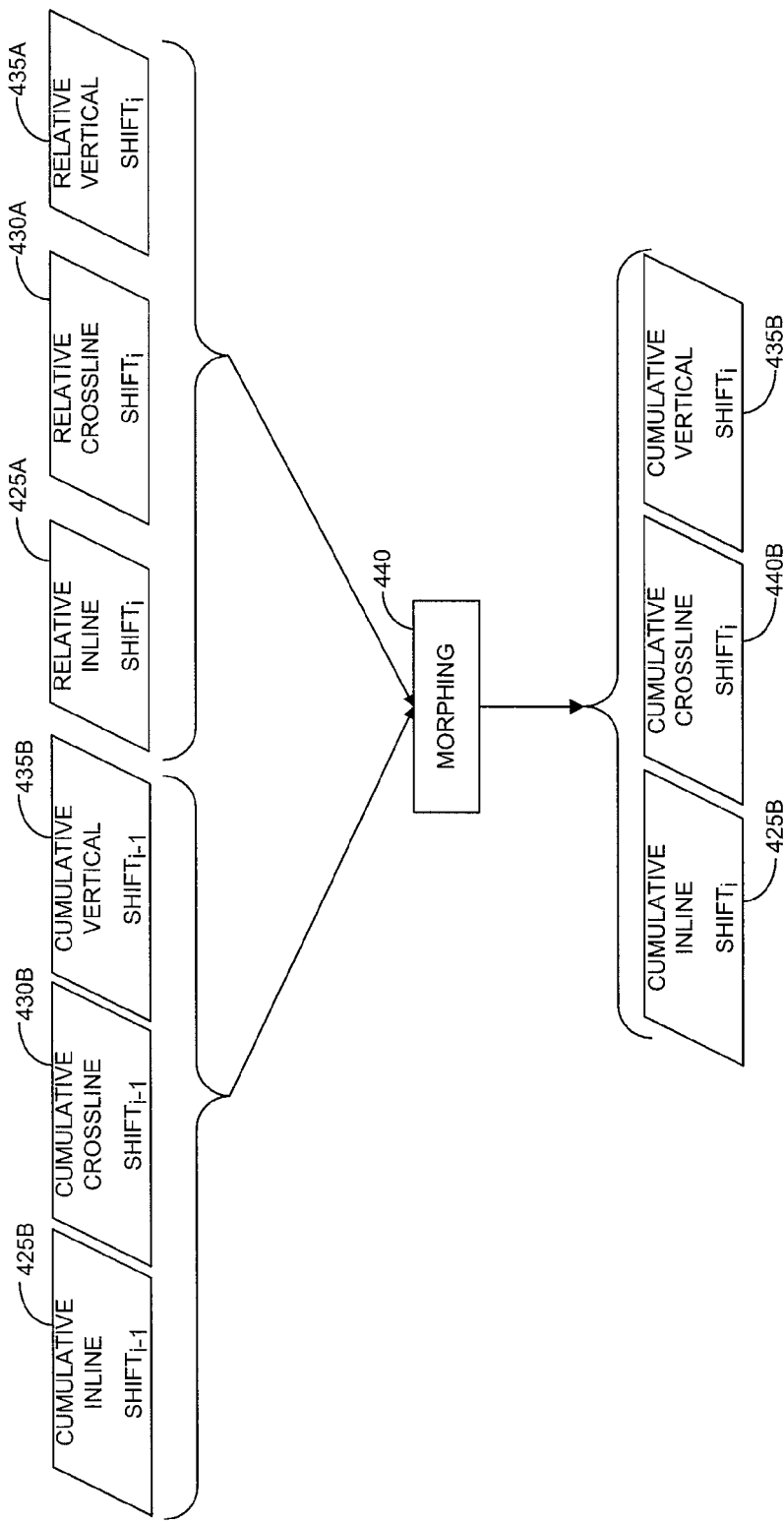
FIG. 4 illustrates a data flow diagram of a recursive morphing process in accordance with one or more implementations of various techniques described herein.

FIG. 4 illustrates a data flow diagram of the recursive morphing process 340 in accordance with one or more implementations of various techniques described herein. As stated, the recursive morphing process 340 may be performed to determine the cumulative shift in each dimension for each offset i. The cumulative shifts are determined recursively, using a morphing process 440 that uses as inputs a cumulative shift for offset i−1 and a relative shift for offset i.

The morphing process 440 may determine a cumulative offset for offset i by adding the relative shift for offset i to the cumulative shift for offset i−1. In other words, the cumulative shifts for all the offsets, i, may be determined recursively because the cumulative shift determined in one iteration of the morphing process 340 may be input to the next iteration.

It should be noted that in an implementation where the reference offset is the offset i=0, the cumulative shift for offset i=1 is the relative shift for offset i=1. Because the cumulative shift for an offset represents the total shift between the offset and the reference offset, the relative shift for offset i=1 and the cumulative shift for offset i=1 are the same.

In such an implementation, the recursive morphing process 340 may begin with offset i=2 because i−1 is the offset i=1. As such, the cumulative inline shift$_1$ 425B, cumulative crossline shift$_1$ 430B, and cumulative vertical shift$_1$ 435B are input to the morphing process 440 with relative inline shift$_2$ 425A, relative crossline shift$_2$ 430A, and relative vertical shift$_2$ 435A. In the first iteration, the morphing process 400 determines the cumulative shift for offset i=2 by adding the cumulative shift for offset i=1 to the relative shift for offset i=2. In this manner, the morphing process may then determine the cumulative shift for offset i=3 by adding the relative shift for offset i=3 to the cumulative shift for offset i=2.

Figure 5:
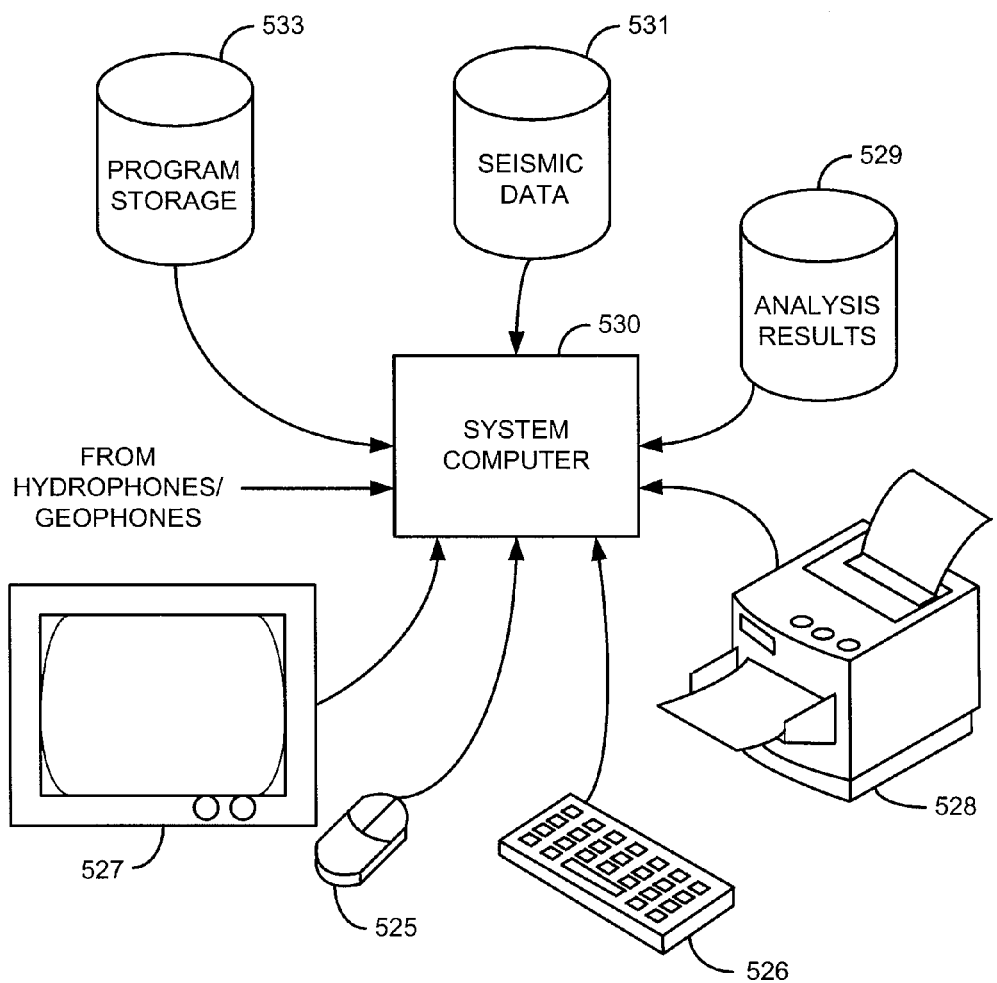
FIG. 5 illustrates a computing system, into which implementations of various technologies described herein may be implemented.

FIG. 5 illustrates a computing system 500, into which implementations of various technologies described herein may be implemented. The computing system 500 may include one or more system computers 530, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 530 may be in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from the receivers may be stored in disk storage device 531. The system computer 530 may retrieve the appropriate data from the disk storage device 531 to process seismic data according to program instructions that correspond to implementations of various technologies described herein. The program instructions may be written in a computer programming language, such as C++, Java and the like. The program instructions may be stored in a computer-readable medium, such as program disk storage device 533. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 530. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 530 may present output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 may be in communication with the receivers (either directly or via a recording unit, not shown), to receive signals indicative of the reflected seismic energy. These signals, after conventional formatting and other initial processing, may be stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
   splitting the seismic data into multiple offset datasets;
   determining a first shift amount in one or more dimensions of the seismic data between a dataset having a first offset and a dataset having a second offset;
   determining a second shift amount in the dimensions between the dataset having the second offset and a dataset having a third offset;
   determining a cumulative shift amount in the dimensions between the first shift amount and the second shift amount; and
   determining, using a microprocessor, a corrected dataset based on the cumulative shift amount and the dataset having the third offset.

2. The method of claim 1, wherein the dimensions comprise at least three dimensions from an offset dimension, an inline dimension, a crossline dimension, a depth dimension and an azimuth dimension.

3. The method of claim 1, wherein determining the first shift amount comprises a three-dimensional matching process based on the dataset having the first offset and the dataset having the second offset.

4. The method of claim 3, wherein the three-dimensional matching process comprises determining binning errors in the inline, crossline, and depth dimensions.

5. The method of claim 1, wherein determining the second shift amount comprises a three-dimensional matching process based on the dataset having the second offset and the dataset having the third offset.

6. The method of claim 5, wherein the three-dimensional matching process comprises determining binning errors in the inline, crossline, and depth dimensions.

7. The method of claim 3, further comprising: applying a filter to the first shift amount in a direction of the second offset, and applying the filter to the second shift amount in the direction of the third offset, wherein the filter is one of a mean filter or a Gaussian filter.

8. The method of claim 7, wherein the three-dimensional matching is repeated recursively using the filtered first shift amount and the filtered second shift amount.

9. The method of claim 7, wherein the size of the filter applied to the first shift amount is based on the first offset and the size of the filter applied to the second shift amount is based on the second offset.

10. The method of claim 3, further comprising:
    applying a mean filter to the first shift amount and the second shift amount; and
    performing the three-dimensional matching process with the mean filtered first shift amount and the mean filtered second shift amount.

11. The method of claim 3, further comprising:
    applying a Gaussian filter to the first shift amount and the second shift amount; and
    performing the three-dimensional matching process with the Gaussian filtered first shift amount and the Gaussian filtered second shift amount.

12. The method of claim 1, wherein determining the first shift amount comprises a four-dimensional matching process based on the dataset having the first offset and the dataset having the second offset.

13. The method of claim 1, wherein determining the second shift amount comprises a four-dimensional matching process based on the dataset having the second offset and the dataset having the third offset.

14. The method of claim 12, wherein the four-dimensional matching process comprises:
    determining binning errors in the inline, crossline, depth, and azimuth dimensions.

15. The method of claim 1, further comprising:
    determining a second corrected dataset based on the dataset having the second offset and the first shift amount; and
    merging the dataset having the first offset, the corrected dataset and the second corrected dataset.

16. A non-transitory computer-readable medium having stored thereon computer-executable instructions which, when executed by a computer, cause the computer to:
    determine a first shift amount in one or more dimensions of the seismic data between a dataset having a first offset and a dataset having a second offset;
    determine a second shift amount in the dimensions of the seismic data between the dataset having the second offset and a dataset having a third offset;
    determine a cumulative shift amount in the dimensions between the first shift amount and the second shift amount; and
    determine a corrected dataset based on the cumulative shift amount and the dataset having the third offset.

17. The non-transitory computer-readable medium of claim 16, wherein the first shift amount and the second shift amount are determined using a four-dimensional matching process based on offset dimension, and at least three of inline, crossline, depth and azimuth dimension.

18. The non-transitory computer-readable medium of claim 17, wherein the four-dimensional matching process determines binning errors in the inline, crossline, depth and azimuth dimensions.

19. The non-transitory computer-readable medium of claim 16, further comprising computer-executable instructions which, when executed by a computer, cause the computer to:
    apply a filter to the first shift amount in a direction of the second offset; and
    apply the filter to the second shift amount in the direction of the third offset; and
    wherein the filter is one of a mean filter or a Gaussian filter.

20. The non-transitory computer-readable medium of claim 17, further comprising computer-executable instructions which, when executed by a computer, cause the computer to:
    apply a mean filter to the first shift amount and the second shift amount; and
    perform the four-dimensional matching process with the mean filtered first shift amount and the mean filtered second shift amount.

21. The non-transitory computer-readable medium of claim 17, further comprising computer-executable instructions which, when executed by a computer, cause the computer to:
    apply a Gaussian filter to the first shift amount and the second shift amount; and
    perform the four-dimensional matching process with the Gaussian filtered first shift amount and the Gaussian filtered second shift amount.

22. A computer system, comprising:
    a processor; and a memory comprising program instructions executable by the processor to:
pre-stack migrate seismic data;
split the seismic data into multiple offset datasets;
determine a first shift amount between a dataset having a first offset and a dataset having a second offset, wherein the first shift amount comprises binning errors for an inline dimension, crossline dimension and depth dimension;
determine a second shift amount between the dataset having the second offset and a dataset having a third offset, wherein the second shift amount comprises the binning errors for the inline dimension, the crossline dimension, and the depth dimension;
determine a cumulative shift amount in the inline dimension, the crossline dimension and the depth dimension between the first shift amount and the second shift amount;
determine a corrected dataset based on the cumulative shift amount and the dataset having the third offset; and
wherein the first shift amount and the second shift amount are determined using a three-dimensional matching process.

23. The system of claim 22, wherein the first shift amount further comprises the binning error in an azimuth dimension, and wherein the second shift amount further comprises the binning error in the azimuth dimension, and wherein the first shift amount and the second shift amount are determined using a four-dimensional matching process.

24. The method of claim 1, wherein the cumulative shift represents a total shift in each dimension between the first shift amount and the second shift amount.

* * * * *